(No Model.) 3 Sheets—Sheet 1.

M. & E. A. JONES & J. W. BLUNDELL.
MACHINE FOR MANUFACTURE OF CIGAR OR OTHER BOXES.

No. 542,768. Patented July 16, 1895.

Fig. 2.ª

Witnesses
H. van Oldeneel
E. K. Sturtevant

Inventors
Mary Jones
Eliza Ann Jones
John William Blundell
by Richards
their Attorneys (No Model.) 3 Sheets—Sheet 2.

M. & E. A. JONES & J. W. BLUNDELL.
MACHINE FOR MANUFACTURE OF CIGAR OR OTHER BOXES.

No. 542,768. Patented July 16, 1895.

Witnesses
H. van Oldenweel
E. K. Sturtevant

Inventors
Mary Jones
Eliza Ann Jones
John William Blundell
by Richards
their Attorneys (No Model.) 3 Sheets—Sheet 3.
M. & E. A. JONES & J. W. BLUNDELL.
MACHINE FOR MANUFACTURE OF CIGAR OR OTHER BOXES.
No. 542,768. Patented July 16, 1895.
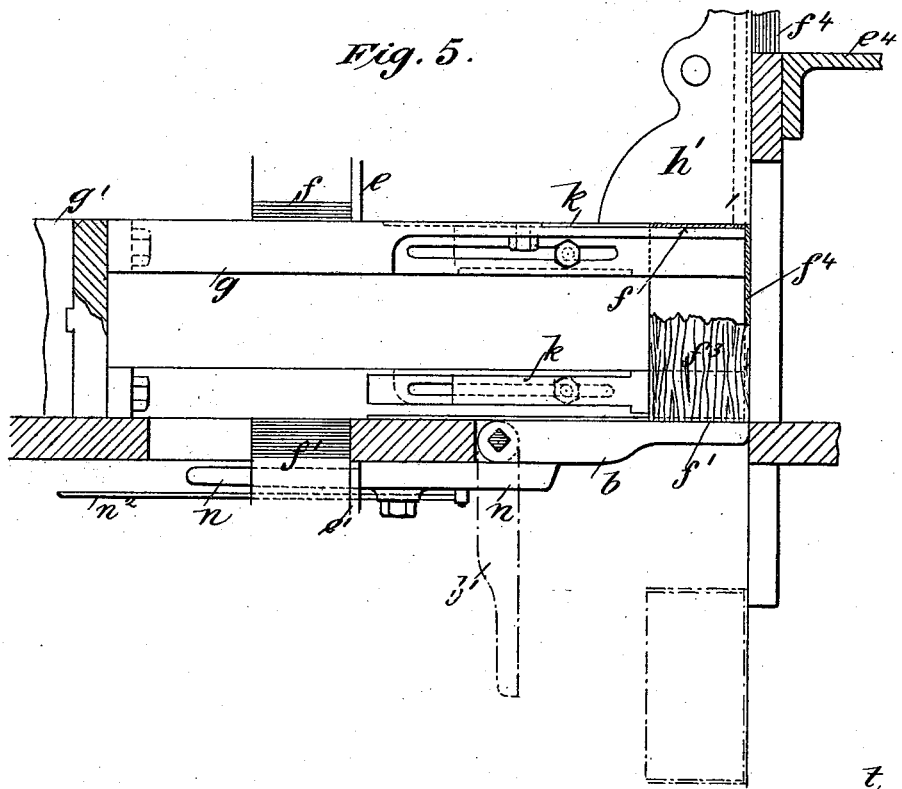
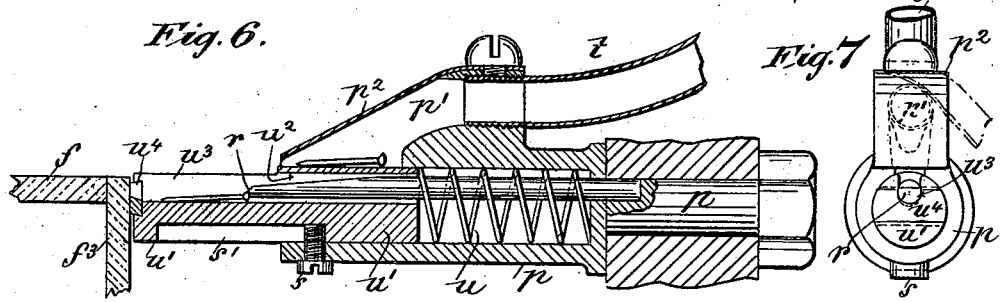
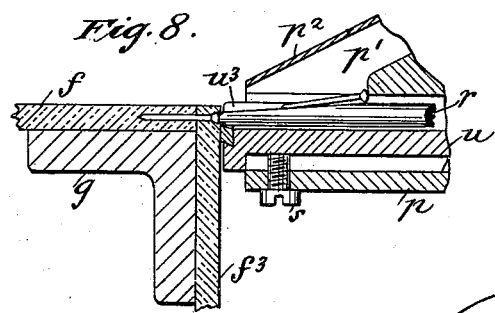
Witnesses
H. van Oldenneel
E. K. Sturtevant
Inventors
Mary Jones
Eliza Ann Jones
John William Blundell
by
their attorneys

UNITED STATES PATENT OFFICE.

MARY JONES, ELIZA ANN JONES, AND JOHN WILLIAM BLUNDELL, OF NOTTINGHAM, ENGLAND.

MACHINE FOR MANUFACTURE OF CIGAR OR OTHER BOXES.

SPECIFICATION forming part of Letters Patent No. 542,768, dated July 16, 1895.

Application filed November 26, 1894. Serial No. 529,994. (No model.) Patented in England April 27, 1894, No. 8,348.

*To all whom it may concern:*

Be it known that we, MARY JONES, ELIZA ANN JONES, and JOHN WILLIAM BLUNDELL, subjects of the Queen of Great Britain, residing at Nottingham, in the county of Nottingham, Kingdom of Great Britain, have invented new and useful Improvements in Machines for the Manufacture of Cigar and other Boxes, (for which we have obtained a patent in Great Britain, No. 8,348, bearing date April 27, 1894,) of which the following is a specification.

The said machine comprises, first, means for the reception and guidance of the box sides, ends, and bottoms, or box sides and ends only, which facilitate the automatic and simultaneous placing of the same in position for nailing; secondly, means for simultaneously and successively bringing and holding in position for nailing in sets the said box parts or sides and ends only; thirdly, an improved construction of nail-driver used for nailing the said box parts together; fourthly, improved means for feeding the nails to the said nail-driver; fifthly, means for discharging automatically the box parts nailed together. We attain these objects by the mechanism illustrated in the accompanying three sheets of drawings, in which—

Figure 1:
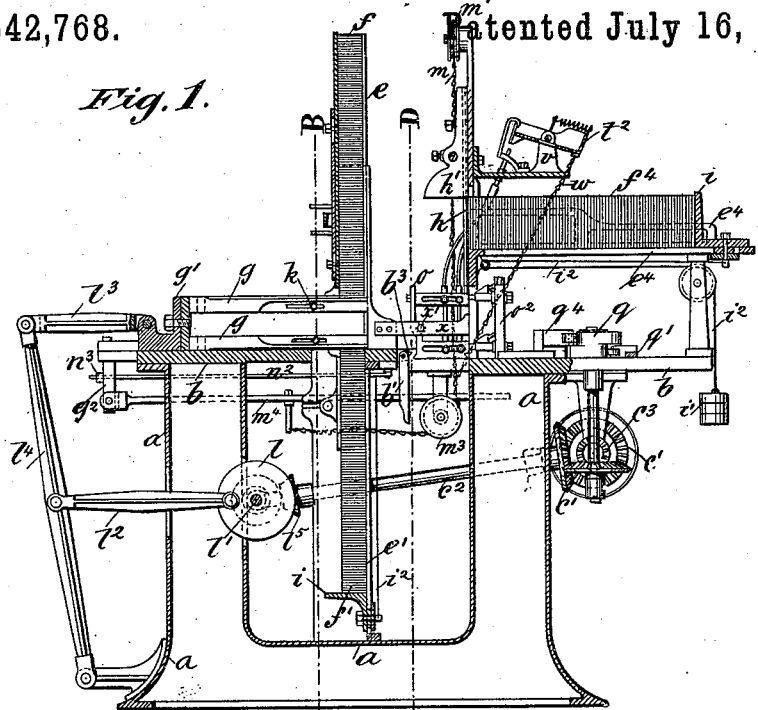
Figure 2:
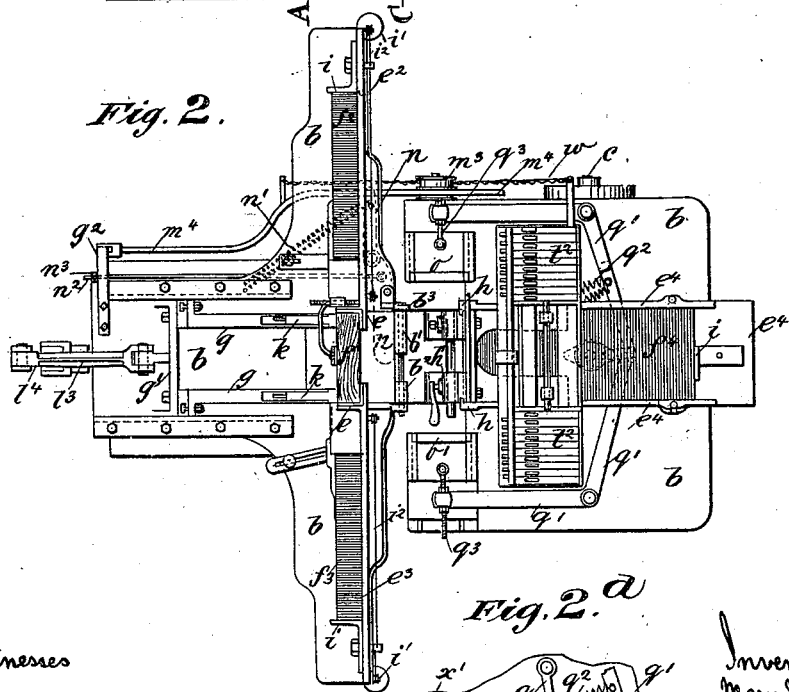
Figure 2:
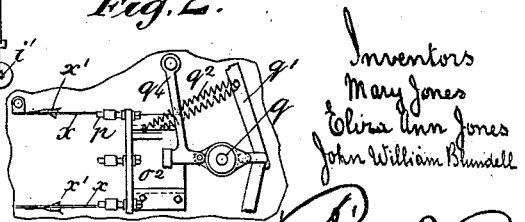
Figure 3:
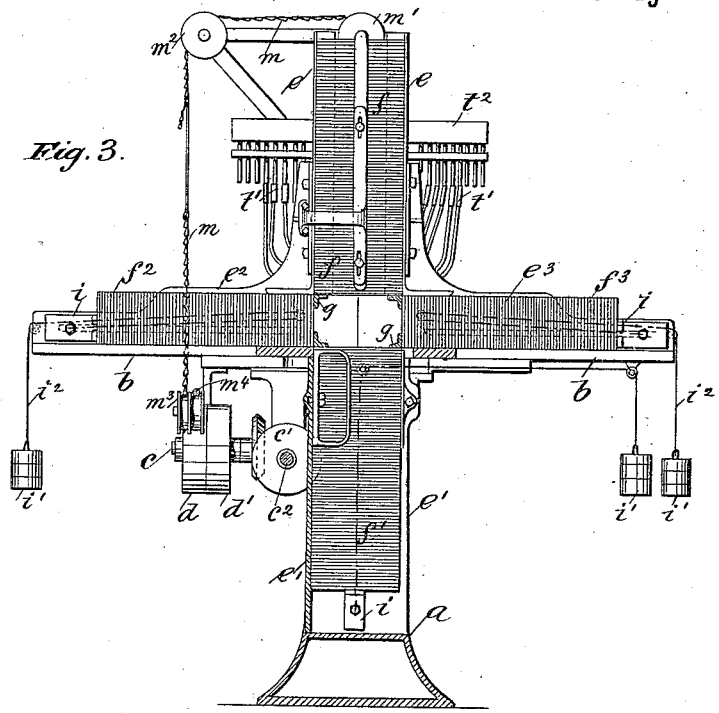
Figure 4:
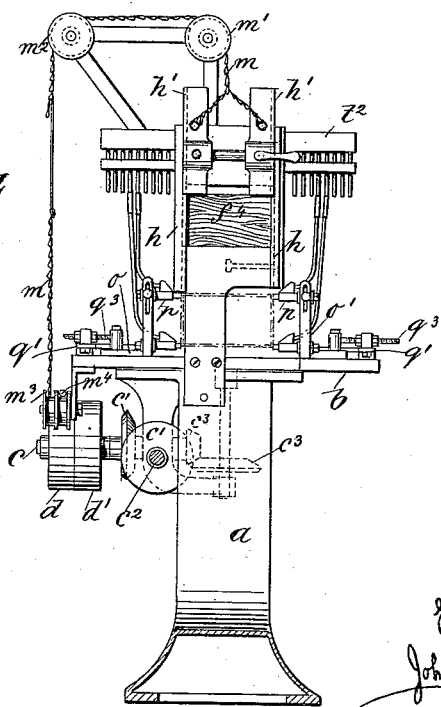

Figure 1, Sheet I, is a longitudinal section, Fig. 2 a plan, Fig. 2$^a$ a detached plan, and Figs. 3 and 4, Sheet II, vertical sections at lines A B and C D of Fig. 1, respectively, of a machine constructed in accordance with our invention and adapted for nailing together the box walls and bottom simultaneously and showing the position of the movable parts of the machine after the box parts have been nailed together and discharged. Fig. 5, Sheet III, is an enlarged longitudinal section of the middle portion of the said machine. Figs. 6 and 8 are longitudinal sections, and Fig. 7 an end view, of the nail-driver.

Similar letters refer to similar parts throughout the several views.

In carrying out our invention, and referring to the figures generally, $a$ is the body of the machine; $b$, the table, and $c$ the driving-shaft, carrying the loose and fast pulleys $d$ $d'$. Upon and below the table $b$ are employed in a vertical line with each other two troughs $e$ and $e'$, adapted to receive and guide the box sides $f$ $f'$ to plunger-arms $g$, adapted to move between the said troughs. Upon the table $b$ are also employed in a horizontal line and at a right angle to the troughs $e$ $e'$ two plates $e^2$ and $e^3$, which, in conjunction with the table $b$, form, also, troughs which serve to receive and guide the box ends $f^2$ and $f^3$ to the plunger-arms $g$.

At the rear of the upper trough $e$ is employed, a short distance above the back part of the table $b$, another trough $e^4$, adapted to receive and guide the box bottoms $f^4$ to a frame $h$, in which is adapted to slide vertically a plunger $h'$. In each case one side of the said troughs is rendered suitably adjustable, so as to increase or decrease its size, in accordance with the size of box to be manufactured. For the same purpose the plunger arms $g$ are rendered adjustable on their block $g'$ and the plunger $h'$ is formed in two parts. The box sides $f'$ and ends $f^2$ and $f^3$ are forced against the plunger-arms $g$ and the box bottom $f^4$ to the frame $h$, set by set, successively, by means of brackets $i$, under the influence of weights $i'$, attached thereto by cords $i^2$ riding over pulleys, which brackets are adapted to slide in contact with the outer end of each row of the said box parts, while the box sides $f'$ descend upon the plunger arm $g$ one by one, by reason of their own weight or by a weight placed thereon. The plunger-arms $g$ carry each externally two plates $k$, which can be adjusted in position thereon longitudinally at a distance from the ends of the plunger-arms in accordance with the depth of box to be made, whether the box sides and ends used are the same depth or not, the front ends of the plates $k$ serving to engage and move the box sides and ends against the box bottom.

Adjacent to the sides of the plunger-arms $g$ are fixed to the machine-table $b$ (see more particularly Fig. 2$^a$) two grippers $x$, each of which carries a spring-stud $x'$ with beveled end, which recedes when the plunger-arms $g$ carry the box parts forward, and takes up afterward its normal position behind the box parts, so that when the plunger-arms $g$ return the box parts nailed will be stripped off the same. One of the said grippers $x$ is fulcrumed to the table $b$ and held in position upon the respective box end by means of a projection $b^3$, formed on the movable table part $b'$, hereinafter described, until the latter drops, which allows the said gripper to recede slightly and thus release the box parts nailed together.

The plunger-block $g'$ and its arms $g$ are reciprocated by means of a crank-disk $l$, fixed upon a rotating-shaft $l'$, and by suitable connections, such as rods $l^2$ and $l^3$ and rocking-lever $l^4$. In the present instance the shaft $l'$ has rotary motion imparted from the driving-shaft $c$ by means of two pairs of bevel-wheels $l^5$ and $c'$ and the shaft $c^2$. The plunger $h'$ is lowered and raised by means of a band or chain $m$ riding over guide-pulleys $m'$, $m^2$, and $m^3$ and connected to a rod $m^4$, one end of which rides upon the guide-pulley $m^3$ and the other being attached by means of a bracket $g^2$ to the plunger-block $g'$. The plunger $h'$ is raised above the box-bottom trough $e^4$, and serves to come in contact with and force down in the frame $h$ one of the bottoms $f^4$, as well as to hold the same and the sides and ends in position when being nailed.

In order to cause the box parts nailed together to leave the machine instantly it is formed with a movable table $b'$ $b^2$, the part $b^2$ of which is rendered adjustable, so as to accommodate different sizes of boxes. By preference we hinge the said movable table to the large table $b$ and raise it into position and lower it by means of a lever $n$, suitably fulcrumed and bearing against the under side of the table $b'$ $b^2$. The outer end of this lever is under the influence of a spring $n'$, which retains the inner end in position underneath the said table while the box parts are placed and nailed together. Connected to the said inner end of the lever $n$ is a rod $n^2$, passing through a hole formed in an arm $g^2$ of the plunger-block $g'$, and having an adjustable collar $n^3$ with which the arm $g^2$ contacts when the block $g'$ is arriving at the end of its outstroke, so as to cause the said rod to draw the lever $n$ from underneath the table $b'$ $b^2$ and thus allow the latter and the nailed box parts to drop.

Adjacent to the ends of the movable table $b'$ $b^2$ and at the back of the frame $h$ is adapted to slide upon the table $b$ a frame $o$ $o'$ $o^2$, carrying a suitable number of adjustable nail-drivers $p$. The frames $o$ $o'$ $o^2$ are reciprocated through the medium of a cam $q$ and suitable connections, such as the angular levers $q'$ under the influence of springs $q^2$ and links $q^3$ and the frame $o^2$ through the lever $q^4$, the frames $o$ and $o'$ being rendered adjustable relative to the plunger-arms $g$ by means of the links $q^3$ to accommodate the various sizes of boxes to be manufactured. The cam $q$ has rotary motion imparted from the driving-shaft $c$ by means of a pair of bevel-wheels $c^3$. Each of the said nail-drivers consist of a tubular stud $p$, (see Figs. 6, 7, and 8, Sheet III,) secured to the respective frames and formed on its top with a cavity $p'$, covered by a lid $p^2$, which facilitates examination in case of need. In the back end of the tubular stud $p$ is employed a spring $u$, adapted to act upon a piston $u'$, employed in the front end thereof. Through the back end of the piston $u'$ is formed a hole $u^2$, communicating with a groove $u^3$, formed in the front end thereof, in which hole $u^2$ is adapted to slide a driver $r$, secured to the back end of the tubular stud $p$. The latter is also furnished with a pin or screw $s$, engaging in a groove $s'$, formed in the piston $u'$, which prevents the latter leaving the tubular stud $p$.

Into the back end of the cavity $p'$ is fixed a curved metal tube $t$, to which is attached a flexible pipe $t'$, (see Figs. 1, 2, 3, and 4,) connected to the nail-feeding tray $t^2$, adapted to oscillate on a bracket $v$, so as to incline alternately forward and backward and thus agitate the nails and secure a regular feeding of the same to the nail-drivers $p$. The front end of the piston $u'$ is furnished with an interchangeable plate $u^4$, the outer edge of which is slightly higher than the base of the grooves $s'$. This plate serves to present each nail in a perfect horizontal position to the box part to be nailed and thus insure the correct driving of the same. The oscillation of the nail-tray $t^2$ is effected by means of a chain $w$ hooked onto the chain $m$.

The operation of the machine is as follows: When the driving-shaft $c$ of the machine is set in rotation, the block $g'$ moves forward, takes with it a set of the said box-walls, and releases the rod $n^2$, so as to allow the spring $n'$ to contract and cause the lever $n$ to raise the table $b'$ $b^2$ in position. In the meantime the plunger $h'$ brings the box bottom positioned below it down upon the table $b'$ $b^2$, and the plunger-arms $g$ then arriving at the end of their instroke place the box-walls against the bottom in position for nailing, which is effected by the drivers $p$, the nails already depositioned in the piston-grooves $u^3$ (see Fig. 6) being thrust into the box parts simultaneously, while in the meantime fresh nails are falling from the cavities $p'$ upon the drivers $r$, which on the return of the latter are allowed to fall into the grooves $u^2$ in the pistons $u'$, ready for the next thrust. The plungers $g$ and $h'$ then return, and when arrived at the end of their outstroke the movable table $b'$ $b^2$, supporting the nailed box parts, drops and permits the latter to leave the machine.

The machine described may also be used for nailing together the walls of boxes only by simply disengaging the plunger $h'$, the nail-driver frame $o^2$ and respective feed, or a machine may be similarly constructed for the said purpose only.

It will also be understood that the position of the troughs described and parts operating in conjunction therewith may be varied without departing from the nature of our invention.

What we claim as our invention, and desire to secure by Letters Patent, is—

1. In combination in a box machine, a series of troughs, for the sides and ends of the box, plungers arranged at the junction of said troughs, a nailing mechanism arranged adjacent to the path of the sides and ends as moved by the plungers and means for feeding a box bottom across said path and in front of the nailing mechanism whereby the box sides and ends will be forced against the bottom, substantially as described.

2. In combination, the troughs arranged in horizontal and vertical pairs and radiating from a central opening the plungers arranged to move through said opening, and the bottom feeding mechanism arranged to feed the bottom across the line of movement of the plungers, substantially as described.

3. In combination, the feeding troughs for the sides, the reciprocating plungers and the plates k carried by the plungers to contact with the box sections, said plates being adjustable lengthwise of the plungers, substantially as described.

4. In combination, the troughs, the plungers arranged to move the blanks from said troughs, the nailing mechanism arranged to receive the blanks from the plungers, the pivoted table adjacent to the nailing mechanism and connections for controlling said table operated by the plunger, substantially as described.

5. In combination, the troughs, the plungers arranged to move the blanks from said troughs, the nailing mechanism arranged to receive the blanks from the plungers, the hinged table section arranged adjacent to the nailing mechanism and means for controlling the same, substantially as described.

6. In combination, the horizontally reciprocating nailing plunger having the driver, the feed trough leading to the driver to discharge the nail thereon, the discharge end of said feed trough being connected with the plunger to move forward therewith the shield covering the discharge end of the feed trough when the plunger and driver are retracted, said shield being carried by a piece $u'$ arranged to bear on the work and hold the shield stationary as the driver moves forward and the spring $u$ for pressing the piece $u'$ forward.

In witness whereof we have hereunto set our hands in presence of witnesses.

MARY JONES.
ELIZA ANN JONES.
JOHN WILLIAM BLUNDELL.

Witnesses as to Mary Jones and Eliza Ann Jones:
  WM. WHITTLEY,
  WM. WRIGHT.

Witnesses as to John William Blundell:
  F. BOSSHARDT,
  STANLEY E. BRAMALL.